July 1, 1952    R. WALSH ET AL    2,601,928
COUPLER

Filed July 30, 1948    3 Sheets-Sheet 1

INVENTORS
Robert Walsh
Jack D. Kennedy
BY George R. Ericson
ATTORNEY

July 1, 1952  R. WALSH ET AL  2,601,928
COUPLER
Filed July 30, 1948  3 Sheets-Sheet 3
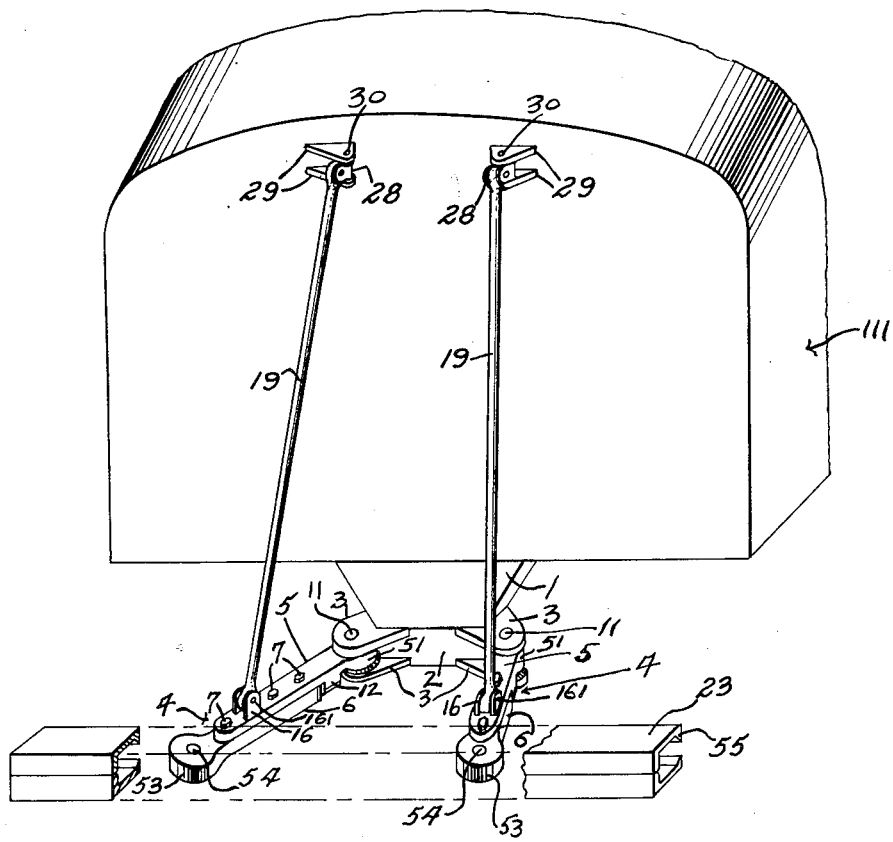
FIG_3_
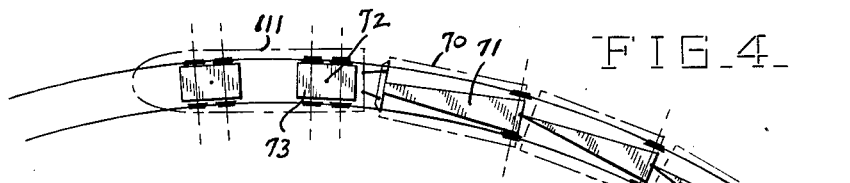
FIG_4_
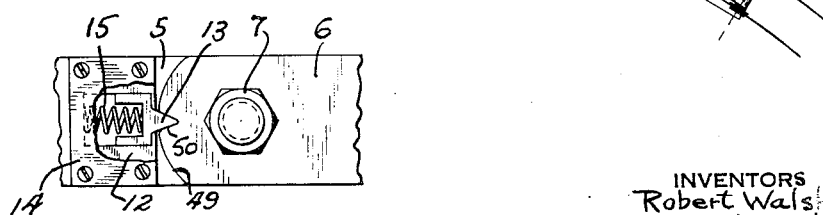
FIG_5_
INVENTORS
Robert Walsh
BY Jack D. Kennedy
George R. Ericson
ATTORNEY Patented July 1, 1952

2,601,928

UNITED STATES PATENT OFFICE 2,601,928

COUPLER

Robert Walsh and Jack D. Kennedy, Wilmington, Del., assignors to American Car and Foundry Company, New York, N. Y., a corporation of New Jersey Application July 30, 1948, Serial No. 41,485

8 Claims. (Cl. 213—3)

1

This invention relates to draft appliances for railway cars and consists particularly of apparatus for coupling a two wheel trail car to a locomotive or car having four or more wheels.

It has been found helpful in permitting high speeds of railway trains on curves to maintain the vertical plane through the line of intersection of the wheel flanges and treads directed slightly toward the inner rail of the curve; by so directing the wheels, the tendency to climb over the head of the outer rail when rounding a curve at high speeds is materially reduced, if not eliminated.

To insure this desired result on a train composed of cars having only two wheels, and those mounted under its rear end, its front end being supported by draft appliances on the preceding car, it is necessary that some points on the longitudinal center line of the car be at all times maintained on the inner side of the track center line. When such a car is connected to a similar preceding car by a fixed tongue pivotally attached to the transverse midpoint of the vertical plane through the axle of the preceding car, the problem is automatically solved, because the only points on the longitudinal center line of the trailing car which lie in the vertical plane of the track center line, are the points of connection with the forward car, and the axle of the trailing car.

The problem becomes more complex if it is necessary to connect the trail car to a locomotive or car mounted on two pivoted trucks, with the truck pivot points some distance inward from the ends of the locomotive. Under such circumstances it would be clearly impracticable to pivotally connect the trail car's fixed tongue to the locomotive, at the pivot point of the rear truck; it is rather desirable to connect the trail car by some means to the rear end of the locomotive. Dependent upon the distance which the rear end of the locomotive extends rearwardly of the rear truck pivot point, the transverse midpoint of the locomotive's rear end will always be on the outer side of the vertical plane through the curved track centerline. If the two-wheeled train car were coupled to the rear end of such a locomotive by a fixed tongue pivotally connected to the transverse midpoint of the locomotive end, the inward direction of the car wheels would be lessened, and the tendency toward climbing over the outer rail head when rounding short radius curves at high speeds increased.

An object of this invention is to provide a

2 coupling device which will maintain all points on the longitudinal center line of a two-wheeled trail car on the inner side of the track center line, thereby causing the car wheels to be directed inwardly when the train is rounding a curve.

Other objects and advantages will be seen by reference to the following specification taken in connection with the accompanying drawings in which:

Figure 3 is a perspective view of the coupling device.

Figure 4 is a diagrammatic view of a train to which the coupling device has been applied.

Figure 5 is a detailed view of a part of the draft members.

Figure 1:
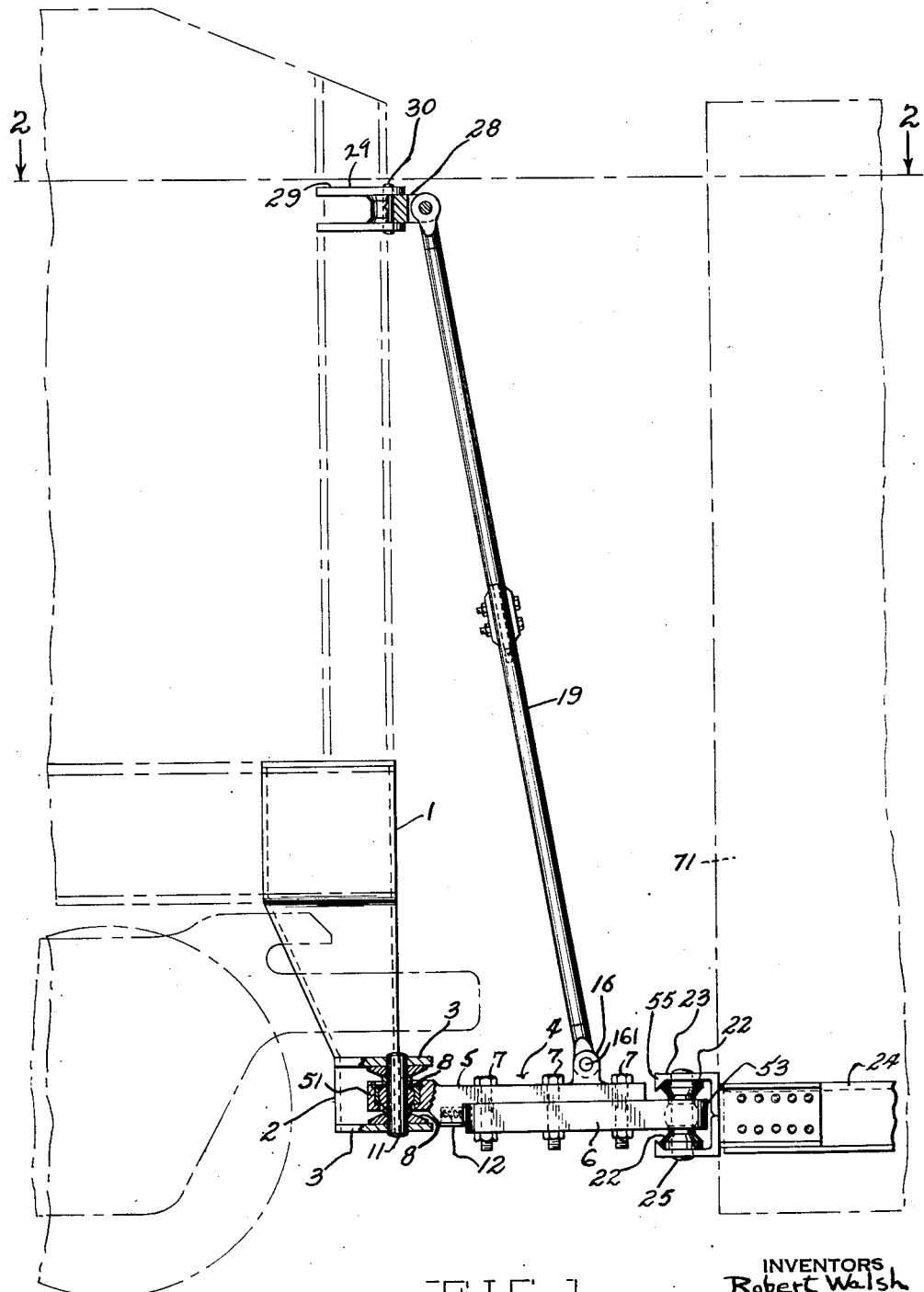
Figure 1 is a side view of the coupling device.

Referring now to the drawings, buffer beam 1 of locomotive 111 is formed with a downwardly extending projection in the form of an inverted frustrated semi-pyramid. The purpose of the downward extension of buffer beam 1, is to provide a draft connection on the locomotive at substantially the same height as the underframe 70 of a low floor two-wheeled trail car 71.

A rectangular box shaped member 2 having pairs of vertically spaced rearwardly extending arms 3, is secured to the lower central surface of buffer beam 1. Arms 3 are provided to form pivot points for two draft devices 4 each consisting of two flat substantially rectangular drawbars 5 and 6 vertically overlapping each other for the greater portion of their lengths, and secured together by three vertical bolts 7.

Drawbars 5 are formed with a substantially semicircular forward end 51 to provide clearance during their pivotal movement. The drawbar ends 51 are perforated to receive hollow, substantially cylindrical bearing elements 8 which include resilient means for absorbing some of the shocks of draft and buffing. The forward ends 51 of drawbars 5 are disposed between and pivotally secured to the pairs of arms 3 by means of pins 11, which fit through such arms and the central opening in bearing elements 8. A hollow lug 12 is formed on the lower face of each drawbar 5. A horizontally slidable spring loaded plunger 13 is retained in lug 12 by a bottom cover plate 14. The V-shaped end of plunger 13 is urged rearwardly by compressed coil spring 15 housed in the hollow lug. The purpose of plunger 13 appears hereafter. Spaced parallel ears 16 are formed on the upper surface of drawbars 5 between the middle and rear bolt holes and carry pivot pins 161 on which the lower end of hanger rods 19 are mounted.

The other element 6 of draft devices 4 is formed with an arcuate forward end 49, concentric with the forward bolt 7 joining drawbars 5 and 6. A vertical V-shaped notch 50 is formed in the middle of the arcuate end of drawbar 6 to receive the end of plunger 13 when drawbars 5 and 6 are properly aligned. The rear ends 53 of drawbars 6 are of substantially semi-circular form, and are provided with openings 54 to receive cylindrical bearings 22 similar in design and function to bearings 8. Bearings 22 are disposed between and pivotally secured to a transversely extending bar 23.

Bar 23 extends horizontally across the front of a two-wheeled trail car and is preferably a channel structure having a vertical web with its open side forward. The bar is preferably secured to the forward end of trail car center sill 24. The flanges of bar 23 are provided at their outer ends with inwardly extending lip strengthening portions 55. Bearings 22 are retained in the proper position in bar 23, by pins 25 which pass through aligned openings in the channel flanges and the central opening of bearings 22.

Figure 2:
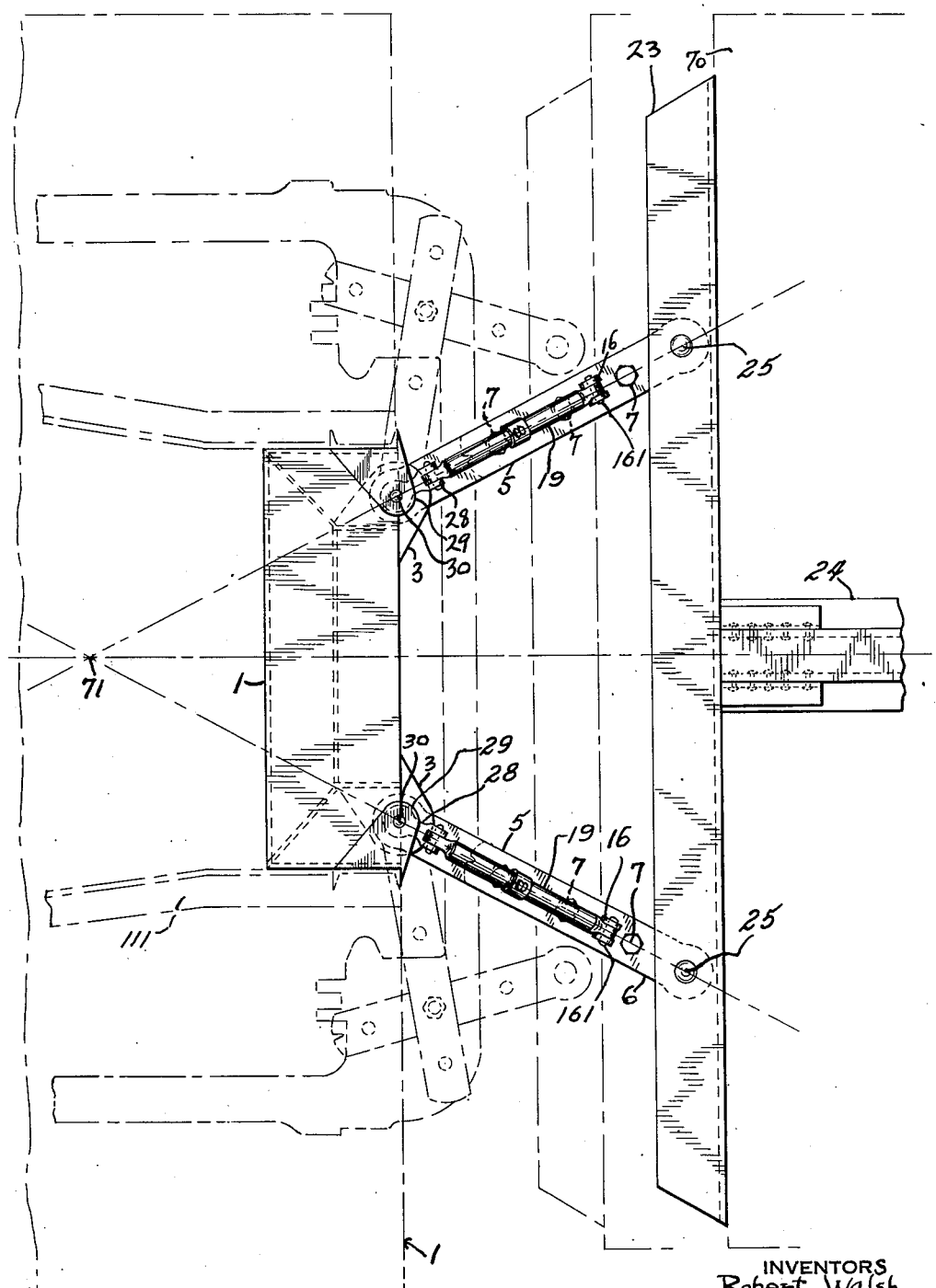
Figure 2 is a plan view of the coupling device from the line 2—2 of Figure 1.

Referring to Fig. 2, it will be seen that the pivot points in bar 23 are equidistant from the train center line, and are somewhat more widely spaced than the pivot points in arms 3. Consequently, buffer beam 1, draft members 4 and channel member 23 form a horizontal quadrilateral, which, when the train is on straight track, so that buffer beam 1 and bar 23 are parallel, is an isosceles trapezoid, of which draft members 4 are the legs, channel member 23 the base, and buffer beam 1 the top chord. The axes of the draft devices are such that their extensions will meet point 71 when the following vehicle is on straight track and the draft device will shift and maintain the center line of the following vehicle on point 71 when on a curve.

Draft devices 4 are retained normal to the axes of bearings 8, about which the draft devices pivot, by hanger devices 19. At their lower ends hanger devices 19 are pivotally connected to drawbar 5 by means of pins 161. At their upper ends, hanger devices 19, are similarly pivotally connected to pivoted clevises 28 which are disposed between spaced horizontal brackets 29 and are pivotally connected for rotation in a horizontal plane to bracket members 29 by means of pins 30. The inner edges of bracket members 29 are secured to the upper end portion of the locomotive collision posts; bracket members 29 are so spaced horizontally that the pivot points of clevises 28 are coaxial with the pivot points in arms 3 so that the axes of the hanger devices are in vertical alignment with the axes of the draft devices.

The resultant structure is in effect two rigid vertical right triangles, having the axes 11, 30 as their vertical legs, draft members 4 as their horizontal legs, and diagonal hanger rods 19 as hypotenuses. The rear ends of drawbars 6 are thus rigidly retained at a constant level with respect to the locomotive, by which the entire assembly is supported, support channel 23, and through bar 23 and center sill 24, cooperate with the trail car rear wheels to support the trail car at the proper level above the rails. The horizontal motion due to the dynamic action of the spring-mounted rear wheels is absorbed by the ball joint at bearing 22.

In operation on straight track, since the car and locomotive ends are parallel to each other and the draft devices 4 are identical and of equal length, the quadrilateral formed by the locomotive and car ends, and the draft devices 4 is an isosceles trapezoid, and since the locomotive exerts an equal pull on the draft devices, the front of the car is centered with respect to the track. When the train rounds a curve, as diagrammatically shown in Fig. 4, the quadrilateral thus formed ceases to be a trapezoid, since the locomotive and car ends are no longer parallel. Since the rear end of the locomotive, and the pivot points thereon remain a fixed distance from the center of a curve of constant radius, and since all sides of the quadrilateral are of fixed length, draft devices 4 and the trail car end change their positions with respect to the track, the rear ends of draft devices 4 moving closer to the center of the curve. This causes the center of the trail car front end to move closer to the center of the curve, and consequently cause the vertical plane of the trail car wheels to be directed slightly inwardly with respect to the curve, thereby reducing the tendency to climb over the outer rail head.

Although the coupler is of a semipermanent type, the trail car may be uncoupled from the locomotive by removing bolts 7 from the draft arms; after uncoupling, drawbars 5 and diagonal tie rods 19 may be rotated about their vertical axes 11, 30 so as not to project rearwardly from the locomotive end. Similarly drawbars 6 may be rotated about bearing 22 and disposed within channel member 23 while not in use.

Coupling is readily accomplished, even though the correct distance is not obtained between locomotive and trail car, by aligning the central bolt holes of drawbars 5 and 6, and securing the central bolt in the aligned holes as shown in dotted line in Fig. 2. When the locomotive is started, draft devices 4 will be fully extended. When drawbars 5 and 6 are thus aligned, the V-shaped end of plunger 13 engages with the V-shaped notch 50 formed in the arcuate forward end of drawbar 6, thereby locking drawbars 5 and 6 in alignment. End bolts are then easily inserted in their aligned holes, and secured to complete the coupling operation.

The invention may be modified in various respects as will occur to those skilled in the art and the exclusive use of all modifications as come within the appended claims is contemplated.

We claim:

1. In a coupler for connecting two railway vehicles, a transverse member connected to the following vehicle, a pair of draft devices of equal length extending at angular but in opposed relation between the transverse member and the rear end of the forward vehicle, means pivotally connecting the ends of said draft devices with said transverse member and the forward vehicle, said pivotal connections being spaced a relatively greater distance apart on said transverse member than on said forward vehicle, and vertically extending means fastened to the forward vehicle for retaining said draft devices in a substantially horizontal plane.

2. In a coupler for connecting two railway vehicles, a pair of draft devices of equal length, each of said draft devices joining the forward end of the rear vehicle at one side to the rear end of the forward vehicle at the corresponding side, pivotal connections between said draft devices and said vehicle ends, said pivotal connections being spaced a relatively greater distance apart on said forward vehicle than on said forward vehicle, and hangers pivotally attached to said draft devices at one end and to said forward vehicle superstructure at the other end for retaining said draft devices in a substantially horizontal plane.

3. In a coupler for connecting two railway vehicles, a pair of draft devices of equal length, each of said draft devices joining the forward end of the rear vehicle at one side to the rear end of the forward vehicle at the corresponding side, each of said draft devices including two aligned drawbars detachably secured together, one of said drawbars being pivotally secured to the forward vehicle, the other drawbar being pivotally secured to the rear vehicle, pivotal connections on said rear vehicle being spaced a relatively greater distance apart than on said forward vehicle, and hangers pivotally attached to said draft devices at one end and to said forward vehicle superstructure at the other end for retaining said draft devices in a substantially horizontal plane.

4. In a coupler for connecting two railway vehicles, a pair of draft devices of equal length, each of said draft devices joining the forward end of the rear vehicle at one side to the rear end of the forward vehicle at the corresponding side, each of said draft devices including two aligned drawbars detachably secured together, one of said drawbars being pivotally secured to the forward vehicle, the other drawbar being pivotally secured to the rear vehicle, automatic means for aligning said drawbars, the pivotal connections on said rear vehicle being spaced a relatively greater distance apart than on said forward vehicle, and hangers pivotally attached to said draft devices at one end and to said forward vehicle superstructure at the other end for retaining said draft devices in a substantially horizontal plane.

5. In a coupler for connecting two railway vehicles, a pair of draft devices of equal length, each of said draft devices joining the forward end of the rear vehicle at one side to the rear end of the forward vehicle at the corresponding side, each of said draft devices including two aligned drawbars detachably secured together, one of said drawbars being pivotally secured to the forward vehicle, the other drawbar being pivotally secured to the rear vehicle, automatic means for aligning said drawbars including a spring loaded plunger on one of said drawbars and a cooperating notch in the other of said drawbars, said plunger being adapted to fit into said notch upon proper alignment of the drawbars, the pivotal connections on said rear vehicle being spaced a relatively greater distance apart than on said forward vehicle, and hangers pivotally attached to said draft device at one end and to said forward vehicle superstructure at the other end for retaining said draft devices in a substantially horizontal plane.

6. In combination with a forward rail vehicle mounted on two pivoted trucks and a rear rail vehicle mounted on two rear wheels, a coupler for connecting said rear vehicle to said forward vehicle and for supporting the forward portion of said rear vehicle, said coupler including a transversely extending member fixed to the forward end of the following vehicle, a pair of draft devices of equal length, each of said draft devices joining the transverse member to the rear end of the forward vehicle, means pivotally connecting said draft devices and said forward vehicle end and said transverse member, said draft device extending at angles intersecting at the pivotal connection of the rear truck of the forward vehicle, and means for retaining said draft devices in a substantially horizontal plane.

7. In combination with a forward rail vehicle mounted on two pivoted trucks and a rear rail vehicle mounted on two rear wheels, a coupler for connecting said forward vehicle to said rear vehicle and for supporting the forward portion of said rear vehicle, said coupler including a pair of draft devices of equal length, each of said draft devices joining the forward end of the rear vehicle at one side to the rear end of the forward vehicle at the corresponding side, pivotal connections between said draft device and said vehicle ends, said pivotal connections being spaced a relatively greater distance apart on said rear vehicle than on said forward vehicle, and hangers pivotally attached to said draft devices at one end and to said forward vehicle superstructure at the other end for retaining said draft devices in a substantially horizontal plane.

8. Coupler mechanism, for two vehicles of which the forward vehicle is mounted to swivel centrally and forwardly of its rear end on a wheel truck and the trailing vehicle is mounted on a pair of rear wheels, comprising a transversely extending member adapted to be connected to the forward end of the trailing vehicle underframe, a pair of diverging horizontally extending draft devices connected at their forward end to the rear end of the forward vehicle and at their rear end to said transversely extending member, said devices diverging so that their extended axes intersect at the swivel mounting on the wheel truck, and a pair of vertically extending hanger devices having their lower ends connected to the draft devices and their upper ends connected to the forward vehicle, said hanger devices diverging so that their axes are in a vertical plane with the axes of said draft devices thereunder.

ROBERT WALSH.
JACK D. KENNEDY.

REFERENCES CITED

The following references are of record in the file of this patent:

UNITED STATES PATENTS

| Number | Name | Date |
|---|---|---|
| 296,859 | Mark | Apr. 15, 1884 |
| 1,293,315 | Blunt | Feb. 4, 1919 |
| 1,360,706 | Aram | Nov. 30, 1920 |
| 2,217,034 | Van Dorn | Oct. 8, 1940 |
| 2,279,993 | Janeway | Apr. 14, 1942 |
| 2,373,348 | Schroeder et al. | Apr. 10, 1945 |